(12) United States Patent
Caruel et al.

(10) Patent No.: US 9,453,478 B2
(45) Date of Patent: Sep. 27, 2016

(54) THRUST REVERSER WITH RETRACTABLE CASCADE VANES

(71) Applicant: AIRCELLE, Gonfreville l'Orcher (FR)

(72) Inventors: Pierre Caruel, Le Havre (FR); Peter Segat, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/566,995

(22) Filed: Dec. 11, 2014

(65) Prior Publication Data

US 2015/0097056 A1    Apr. 9, 2015

Related U.S. Application Data

(63) Continuation of application No. PCT/FR2013/051339, filed on Jun. 10, 2013.

(30) Foreign Application Priority Data

Jun. 12, 2012 (FR) ...................... 12 55508

(51) Int. Cl.
*F02K 1/72*   (2006.01)
*F02K 1/76*   (2006.01)
(Continued)

(52) U.S. Cl.
CPC . *F02K 1/72* (2013.01); *F02K 1/09* (2013.01); *F02K 1/763* (2013.01); *F02K 1/766* (2013.01); *Y02T 50/671* (2013.01)

(58) Field of Classification Search
CPC ............ F02K 1/56; F02K 1/566; F02K 1/09; F02K 1/64; F02K 1/70; F02K 1/72; F02K 1/74; F02K 1/76; F02K 1/763; F02K 1/766; B64D 33/04
See application file for complete search history.

(56) References Cited

U.S. PATENT DOCUMENTS 5,655,360 A    8/1997  Butler
6,145,786 A *  11/2000  Baudu ................. F02K 1/766
                                                244/110 B
(Continued)

FOREIGN PATENT DOCUMENTS

FR    2 911 372 A1    7/2008
FR    2 929 998 A1    10/2009
(Continued)

OTHER PUBLICATIONS

International Search Report issued Sep. 27, 2013 in International Application No. PCT/FR2013/051339.

*Primary Examiner* — Ehud Gartenberg
*Assistant Examiner* — Filippo Manfredi
(74) *Attorney, Agent, or Firm* — Burris Law, PLLC

(57) ABSTRACT

A thrust reverser for a turbojet engine nacelle includes a movable cowl, cascade vanes and a portion forming a movable variable nozzle. The cowl translates between a closing position and a maintenance position which is located beyond a thrust reversal position. In the maintenance position, the cowl opens a passage within the nacelle and allows access the inside of the nacelle. The variable nozzle is translated by an actuator between reduced ejection section and increased section positions. In particular, the cascade vanes move between retracted and active positions and are housed in an envelope formed by a fan casing and an outer cowl in the retracted position. In the active position, the cascade vanes are displaced downstream by an actuator through a passage open by the movable cowl in the nacelle. The actuator of the cascade vanes is dissociable from the actuator driving the variable nozzle.

8 Claims, 5 Drawing Sheets

(51) Int. Cl.
*F02K 1/09* (2006.01)
*F02K 1/64* (2006.01)

(56) References Cited

U.S. PATENT DOCUMENTS

| | | | | |
|---|---|---|---|---|
| 2002/0145078 | A1* | 10/2002 | Rouyer | F02K 1/766 244/110 B |
| 2010/0001123 | A1* | 1/2010 | Hillereau et al. | 244/54 |
| 2010/0058736 | A1* | 3/2010 | Lenk | F02K 1/766 60/226.2 |
| 2010/0115958 | A1* | 5/2010 | Parham | 60/771 |
| 2010/0193628 | A1* | 8/2010 | Welch | B64D 29/06 244/54 |
| 2010/0212286 | A1* | 8/2010 | West et al. | 60/226.2 |

FOREIGN PATENT DOCUMENTS

| | | |
|---|---|---|
| FR | 2 952 681 A1 | 5/2011 |
| FR | 2 952 908 A1 | 5/2011 |
| FR | 2 965 589 A1 | 4/2012 |
| WO | 2011/135217 A1 | 11/2011 |
| WO | 2011/135238 A1 | 11/2011 |

* cited by examiner

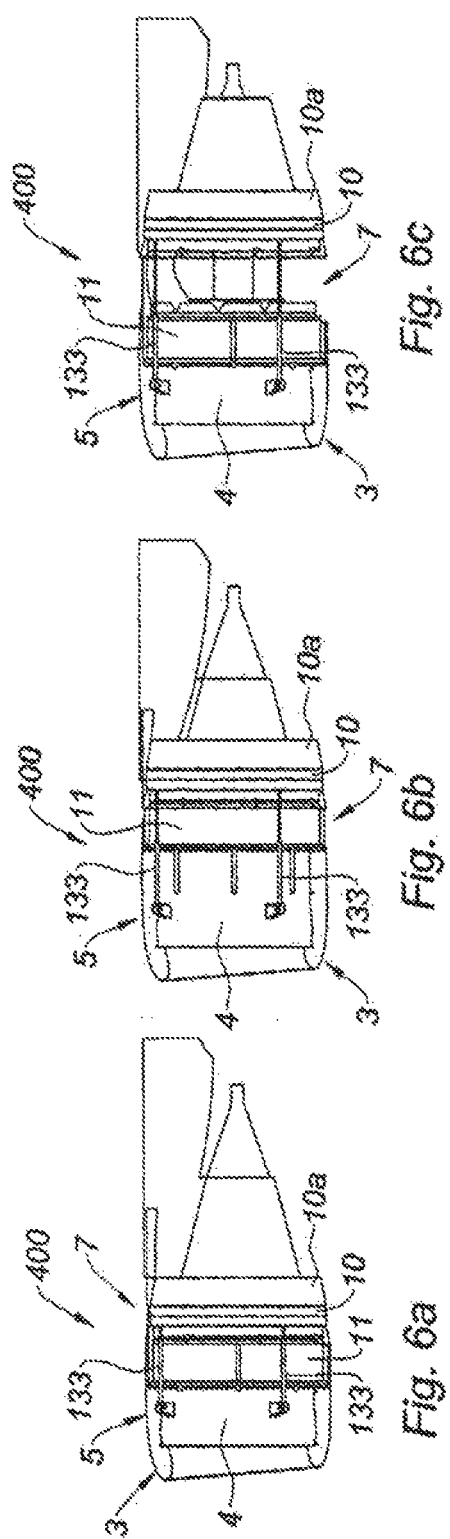

THRUST REVERSER WITH RETRACTABLE CASCADE VANES

CROSS-REFERENCE TO RELATED APPLICATIONS

This application is a continuation of International Application No. PCT/FR2013/051339, filed on Jun. 10, 2013, which claims the benefit of FR 12/55508, filed on Jun. 12, 2012. The disclosures of the above applications are incorporated herein by reference.

FIELD

The present disclosure relates to a thrust reverser for a turbojet engine nacelle.

BACKGROUND

The statements in this section merely provide background information related to the present disclosure and may not constitute prior art.

An aircraft is driven by several turbojet engines each housed in a nacelle accommodating an assembly of annex actuating devices related to its operation and providing various functions when the turbojet engine is in operation or at shutdown.

These annex actuating devices comprise in particular a thrust reversal mechanical system.

A turbojet engine nacelle generally has a substantially tubular structure comprising an air inlet upstream of the turbojet engine, a mid-section intended to surround a fan of said turbojet engine, a downstream section intended to surround the combustion chamber of the turbojet engine and optionally integrating thrust reversing means, and is generally terminated with an ejection nozzle the outlet of which is located downstream of the turbojet engine.

Modern nacelles are intended to accommodate a bypass turbojet engine capable of generating via the blades of the rotating fan a hot air flow (primary flow) and a cold air flow (secondary flow) which circulates outside the turbojet engine through an annular passage, also called flow path, formed between a fairing of the turbojet engine and an inner wall of the nacelle. The two air flows are ejected from the turbojet engine from the rear of the nacelle.

The role of a thrust reverser, during the landing of an aircraft, is to improve the braking ability thereof by redirecting forward at least a part of the air ejected from the turbojet engine. In this phase, the thrust reverser obstructs at least a part of the flow path of the cold flow and directs this flow to the front of the nacelle, therefore generating a counter-thrust which adds to the braking of the wheels and air brakes of the aircraft.

In general, the structure of a thrust reverser comprises a thrust reverser cowl displaceable between, on the one hand, a deployed position in which it opens a passage within the nacelle intended for the diverted air flow, and on the other hand, a retracted position in which it closes this passage.

In the case of a cascade-type thrust reverser, the reorientation of the air flow is performed by cascade vanes, associated with reversing flaps that block at least partially the air circulation flow path, the cowl having only a simple sliding function aiming to uncover or cover these cascade vanes.

The reversing flaps, also called blocking flaps, in turn, are activated and driven by slide of the movable cowl until obstructing at least partially the flow path downstream of the cascade vanes, so as to optimize reorientation of the cold air flow.

As is known, the cascade vanes are mounted on a front frame serving as a fixed portion of the thrust reversal device and fastened to a casing of the fan of the turbojet engine. This front frame also provides the support of actuating cylinders of the movable cowls.

Most often, the downstream section of the nacelle is made of two substantially semi-cylindrical semi-structures located, at the upper portion (called 12 hours), on both sides of an engine pylon of fastening of the turbojet engine to the aircraft and connected therebetween at the lower portion (called 6 hours).

The semi-structures are fastened to the engine pylon via an upper half-beam, and also comprise a lower half-beam. These lower and upper half-beams are equipped with slide rails for the thrust reversal movable cowl of the corresponding semi-structure.

For maintenance purposes, these semi-structures are pivotally mounted on the engine pylon about an axis substantially longitudinal of the nacelle via hinges. Latches at the lower portions provide the closing of the structure.

A nacelle having such a downstream structure having semi-cylindrical cowlings is commonly referred to as nacelle with a C or D duct (C-Duct or D-Duct).

Have also been developed nacelles called with an O structure (O-Duct) having a downstream structure that no longer exhibit two substantially semi-cylindrical semi-structures but one single substantially peripheral structure extending from one side of the engine pylon to the other side.

As a result, such a structure generally no longer exhibits two thrust reversal movable cowls but one single substantially peripheral cowl.

For maintenance purposes, such a downstream section no longer opens by the pivoting of the semi-structure about a substantially longitudinal axis of the nacelle but by downstream translation along this axis.

For a detailed description, one may refer to documents FR 2 911 372 and FR 2 952 681.

It will be noted in particular that for the purposes of the operations of maintenance and access to the combustion chamber of the turbojet engine, the front frame supporting the cascade vanes may in turn be disconnectable and moved backward with the outer cowling.

Furthermore, there are known called short O-Duct nacelle structures, in which the cascade vanes are also movably mounted in translation and able to be retracted at least partially along the thickness of the mid-section of the nacelle and thus overlap the fan casing when the thrust reverser is inactive, in the direct jet position. In the thrust reversal position, the cascade vanes are displaced with the movable cowl. The cascade vanes are hence no longer totally housed inside the movable cowl and thus occupy a less significant space which allows shortening it.

Besides a thrust reversal function, a reverser movable cowl belongs to the rear section and may exhibit a downstream portion forming an ejection nozzle.

The section of the ejection nozzle may be adapted depending on the different flight phases, namely, in particular, take-off, ascent, cruise, descent and landing in order to always preserve an optimal nozzle section depending on the turbojet engine speed. The nozzle will be then called variable nozzle.

Such a variable nozzle is associated with an actuating system allowing this section variation.

There are several solutions for realizing a variable nozzle.

A first solution is to provide pivoting terminal flaps mounted on the thrust reversal movable cowl and the pivoting of which is reflected in an increase or in a reduction of the outlet section. Such a system is described in particular in document FR 2 929 998.

There are also known panels movably mounted in translation inside the thrust reversal movable cowl, in a telescopic manner, the backward motion or the retraction of which similarly cause the increase or the reduction of the outlet section.

In such cases, the variable nozzle device has a dedicated actuating system, or a double-acting actuating system also associated with the reversal movable cowl.

Such solutions allow better accommodating the inner and outer aerodynamic lines of the nacelle and allow a better structural strength of the assembly.

In order to simplify the actuating systems and lighten the nacelle, another solution may also be envisaged thanks to the substantially conical shape of the back of the body of the nacelle: the thrust reversal movable cowl also provides by itself a variable nozzle function. The operation principle of such an arrangement is described in the document U.S. Pat. No. 5,655,360.

Although such an arrangement allows substantially lightening the rear section, its design involves some difficulties.

Indeed, during the displacement of the movable cowl in the nozzle mode, it should be provided that this displacement does not cause opening of the thrust reversing passage in the nacelle. Moreover, the movable cowl could be retracted in order to allow reducing the nozzle section relative to a nominal position.

This requires an overlay area at a rear end of the midsection, an overlay area which generates an undesirable external aerodynamic accident.

Moreover, in the case of a thrust reversal system with retractable cascade vanes, a displacement of the movable cowl normally causes the concomitant displacement of the cascade vanes, or the displacement of said cascade vanes is useless during a displacement of the cowl in the nozzle mode.

Furthermore, the existing solutions may hardly be integrated with an O-Duct type nacelle with a peripheral thrust reverser cowl and this, either because of the installation of rails between the thrust reverser movable cowl and the outer structure which may be translated for maintenance purposes, or because of the complexity of the compatibility with the need to translate the assembly for accessing the engine compartment.

SUMMARY

The present disclosure provides a thrust reverser for turbojet engine nacelle comprising at least one cowl movable in translation along a direction substantially parallel to a longitudinal axis of the nacelle between a closing position in which it provides the aerodynamic continuity of the nacelle and inhibits diverting means, and a fully opening maintenance position, located beyond a thrust reversal position, in which it opens a passage in the nacelle and allows accessing the inside of the latter, said movable cowl being further extended by at least one portion forming a movable variable nozzle associated with at least one means for driving in translation along a substantially longitudinal direction of the nacelle between a reduced ejection section position and an increased section position, characterized in that the diverting means are movably mounted longitudinally between a retracted position upstream of the movable cowl in which they may be housed inside an envelope of the nacelle comprised between a fan casing and an outer cowl of the nacelle, and an active position in which they are displaced downstream so as to be capable of extending through an open passage by the movable cowl in the nacelle, and in that said diverting means are associated with at least one actuator dissociable from the actuator of the variable nozzle.

Thus, by providing diverting means that are movable and able to be driven in a disassociated manner from the portion forming a variable nozzle, the thrust reversal device is capable of adopting multiple configurations, thus satisfying the needs for displacing the movable portions in the thrust reversal mode as well as in the maintenance mode.

According to a first form, the portion forming a variable nozzle is integrated to the movable cowl, the whole exhibiting a one-piece nature.

According to a second form, the portion forming a variable nozzle is movably mounted relative to the movable cowl, the latter being further equipped with disconnectable attaching means with said portion forming a variable nozzle.

The disconnectable attaching means allow either a driving of the variable nozzle alone (disconnected means; variable nozzle mode), or a joint driving of the thrust reverser movable cowl and of the nozzle (locked means, maintenance mode or thrust reversal mode).

Advantageously, the diverting means are equipped with disconnectable attaching means with the movable cowl.

The movable cowl is further equipped with disconnectable attaching means with the portion forming a variable nozzle.

According to one feature of the present disclosure, the attaching means between the diverting means and the movable cowl are adapted to collaborate with a locking device arranged between the diverting means and a fixed structure of said thrust reverser or said nacelle.

According to another feature of the thrust reverser according to the present disclosure, the attaching means between the movable cowl and the portion forming a variable nozzle are adapted to collaborate with a locking device arranged between the diverting means and a fixed structure of said thrust reverser or of said nacelle.

In an alternative or complementary manner, the diverting means are associated with at least one dedicated actuator. Such a dedicated actuator also constitutes an actuator dissociable from that of the nozzle to the extent that it allows an in-phase (associated) driving or a different (disassociated) driving.

According to another form, the diverting means comprises cascade vanes.

Advantageously, the thrust reverser is a thrust reverser of the type called O-Duct type.

The present disclosure also relates to a turbojet engine nacelle, characterized in that it is equipped with at least one thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6a, 6b, 6c are representations in different configurations of a fourth form of the present disclosure.

Figure 1:
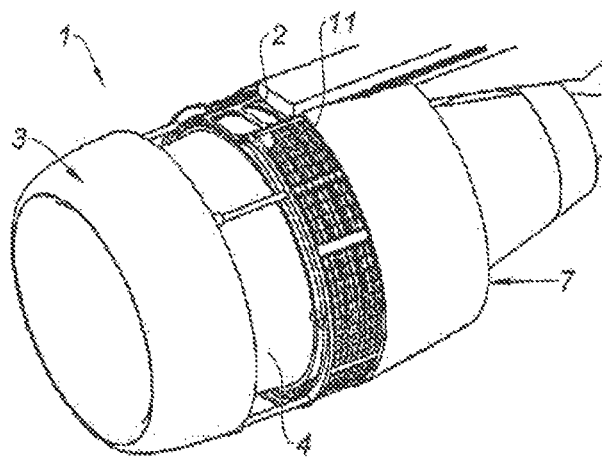
FIG. 1 is a perspective representation of a turbojet engine nacelle with an O-type duct and with a thrust reverser with retractable cascade vanes.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a general representation of a turbojet engine nacelle 1 with an O-type duct and equipped with a thrust reversal device.

This nacelle 1 is intended to hang from an engine pylon (not visible) via a fixation block 2 serving as a connecting interface.

It conventionally comprises an air inlet upstream section 3, a mid-section 5 (not visible in FIG. 1) intended to surround a casing 4 of a fan of the turbojet engine, and a downstream section 7 equipped with the thrust reversal device.

As described above, the thrust reversal device comprises a substantially peripheral cowl 10 extending on both sides of the engine pylon, and an assembly of cascade vanes 11.

The cascade vanes 11 are movably mounted in translation along a substantially longitudinal direction of the nacelle 1 between a retracted position in which they are stored at least partially along the thickness of the mid-section 5 upstream of the downstream section and overlap at least partially the fan casing 4; and a deployed position in which they extend downstream of the mid-section 5 at the downstream section.

The cowl 10 is movably mounted in translation along a direction substantially parallel to a longitudinal axis of the nacelle 1 between several positions:

A first position corresponding to a closing position (also called direct jet position) and in which it provides the aerodynamic continuity of the nacelle 1. In this position, the cascade vanes 11 are in the retracted position.

A second position, called thrust reversal position, in which the cowl 10 is moved backward and opens a reversing passage in the nacelle 1. In this position, the cascade vanes 11 are moved backward and reorient the air flow traveling through the passage.

A third position, called maintenance position, in which the movable cowl 10 is moved fully backward and opens a significant passage in the nacelle so as to allow accessing the inside of the latter.

The present disclosure provides a nacelle as precedingly described and in addition equipped with a variable nozzle device comprising a portion forming a movable variable nozzle associated with at least one means for driving in translation between at least one reduced ejection section position and/or one increased section position.

Figure 2A:
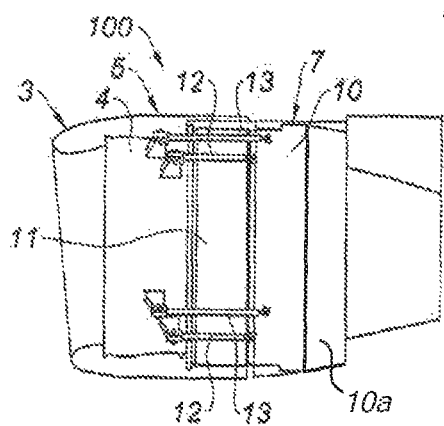
FIGS. 2a, 2b, 2c are representations in different configurations of a first form of the present disclosure.
Figure 2B:
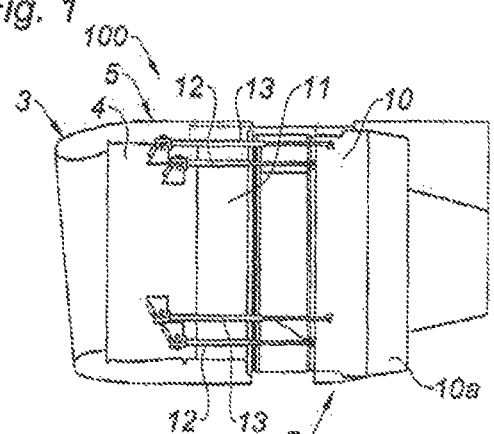
Figure 2C:
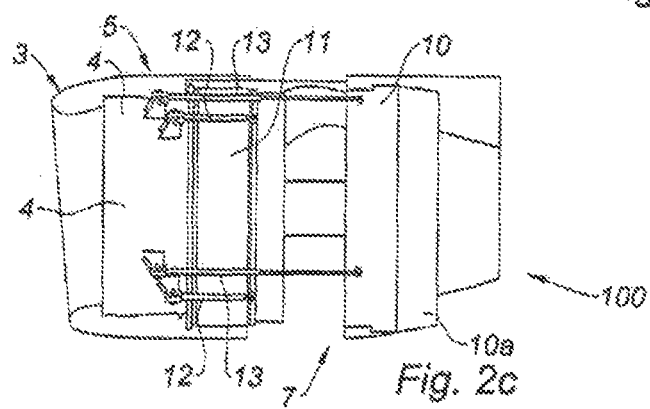

FIGS. 2a to 2c show a nacelle 100 according to a first form of the present disclosure.

In this form, the variable nozzle is constituted by a terminal portion 10a of the movable cowl with which it is integral. The nozzle variation is hence performed by displacing the cowl 10 and nozzle portion 10a assembly the required distance for obtaining the desired section.

According to this form, each movable portion is able to be driven by dedicated actuator allowing to choose between a disassociated or an associated driving of said movable portions, or even a totally independent driving.

More precisely, as precedingly explained, the cascade vanes 11 constitute a first movable portion which is able to be driven in translation by a first assembly of actuating cylinders 12.

The movable cowl 10 and its portion forming a movable nozzle 10a together constitute a second movable portion able to be driven in translation by a second assembly of actuating cylinders 13.

FIG. 2a shows the nacelle 100 in the direct jet configuration, with the movable cowl 10 closed and the cascade vanes 11 retracted. The nozzle section variation is obtained by slight displacements around the closing position of the movable cowl 10 by means of the cylinders 13.

FIG. 2b shows the nacelle 100 in the thrust reversing position. The cylinders 13 have pushed the movable cowl 10 in its reversing position, and the cylinders 12 have deployed the cascade vanes 11 across the opening made by the displacement of the movable cowl 10 in the nacelle 100.

FIG. 2c shows the nacelle 100 in the maintenance position. The cascade vanes 11 are retracted and the cylinders 13 have pushed the movable cowl 10 downstream in the fully backward position. The opening arranged in the nacelle 100 is then large enough to allow accessing the inside of the latter.

FIGS. 3a to 3d show a nacelle 200 according to a second form of the present disclosure.

In this form, the variable nozzle is constituted by a terminal portion 10a of the movable cowl which is movably mounted in a telescopic manner inside the movable cowl 10, the latter constituting an intermediate structure.

In this form, there are hence three movable portions, namely the cascade vanes 11, the thrust reversal movable cowl 10 and the variable nozzle portion 10a.

The nozzle variation is hence performed by displacing the variable nozzle portion 10a alone, the thrust reversal movable cowl 10 remaining in the closing position, integral with the cascade vanes 11. The displacement of the variable nozzle portion 10a is performed by means of an assembly of second actuators 131.

As with the nacelle 100, the cascade vanes 11 are driven via an assembly of dedicated first actuating cylinders 12 allowing to choose between a driving of said cascade vanes disassociated or associated with that of the variable nozzle 10a.

The cascade vanes 11 and the thrust reversal movable cowl 10 are equipped with latch-type disconnectable attaching means.

Figure 3A:
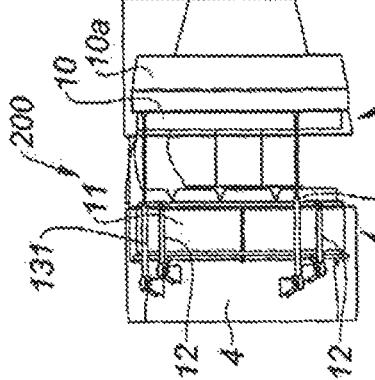
FIGS. 3a, 3b, 3c, 3d are representations in different configurations of a second form of the present disclosure.

FIG. 3a shows the nacelle 200 in the direct jet configuration, with the movable cowl 10 closed and integral with the cascade vanes 11, these cascade vanes 11 being in the retracted position.

Figure 3B:
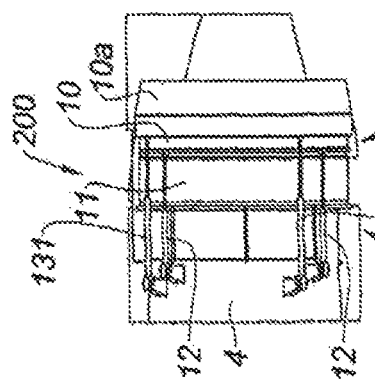

The nozzle section variation is obtained by autonomously displacing the nozzle portion 10a alone around its reference position by means of the actuators 131 (FIG. 3b: increase of the ejection section by moving the nozzle portion 10a backward).

Figure 3C:
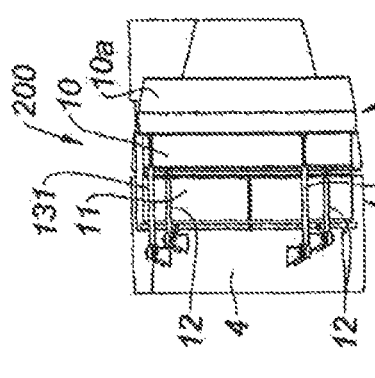

FIG. 3c shows the nacelle 200 in the thrust reversal position. In this phase, the movable cowl 10 is still connected to the cascade vanes 11. The actuators 131 have pushed the variable nozzle portion 10a and the cylinders 12 have deployed the cascade vanes 11 across the opening made by the displacement of the movable cowl 10 in the nacelle 200.

Figure 3D:
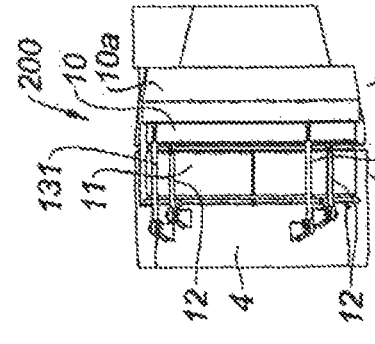

FIG. 3d shows the nacelle 200 in the maintenance position. In this phase, the movable cowl 10 is disconnected from the cascade vanes 11. The cascade vanes 11 are retracted and the actuators 131 have pushed the nozzle portion 10a with the movable cowl 10 downstream in the fully backward position. The driving of the movable cowl is made possible thanks to an end-of-travel abutment provided between said movable cowl 10 and the nozzle portion 10a which has allowed driving said cowl. Alternatively, a pin-type mechanical connection may be manually positioned between the movable cowl 10 and the nozzle 10a in order to attach their motion only for the maintenance phase.

The opening arranged in the nacelle 200 is then large enough to allow accessing the inside of the latter.

Figure 4A:
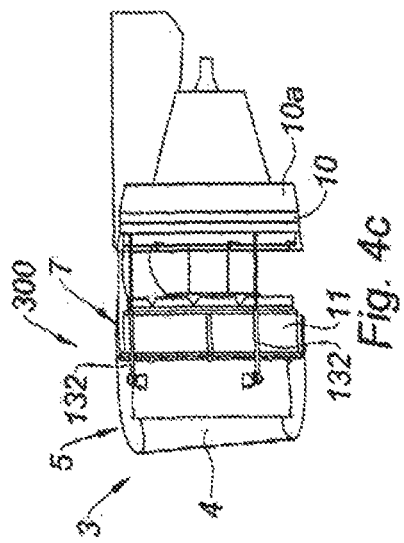
FIGS. 4a, 4b, 4c are representations in different configurations of a third form of the present disclosure.
Figure 4B:
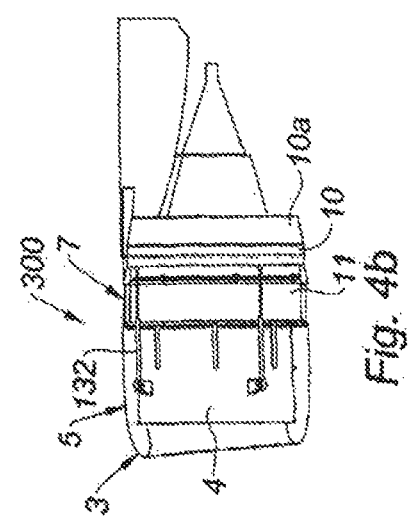
Figure 4C:
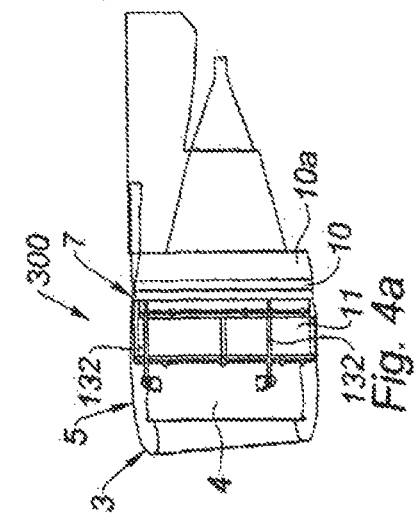

FIGS. 4a to 4c show a nacelle 300 according to a third form of the present disclosure.

In this form, the variable nozzle is constituted, as with the nacelle 100, by a terminal portion 10a of the movable cowl with which it is integral. The nozzle variation is hence performed by displacing the cowl 10 and portion nozzle 10a assembly the required distance for obtaining the desired section.

Yet, unlike the nacelle 1, the two movable assemblies, namely the cascade vanes 11 and the cowl 10/nozzle 10a assembly, each no longer have their dedicated actuating means, but are driven by means of one single assembly of actuators 132 connected to the cowl 10/nozzle 10a assembly.

The dissociable driving between the cascade vanes 11 and the cowl 10/nozzle 10a assembly is performed via disconnectable locking devices between the cascade vanes 11 and the movable cowl 10. The locking devices are generally in the form of U-shaped elements that engage a bolt to prevent movement of the cascade vanes.

When these locking devices are disconnected, the actuators 132 allow driving the cowl 10/nozzle 10a assembly in the nozzle 10a section variation mode or in the maintenance mode (FIGS. 4a and 4c respectively).

When these locking devices are connected, they provide the attaching of the cowl 10 and the cascade vanes 11, and the actuators 132 then allow driving the cowl 10/nozzle 10a assembly and the cascade vanes 11 in the thrust reversal mode (FIG. 4b).

An example of the different steps of locking and attaching the different movable portions of the nacelle 300 is represented in FIGS. 5a to 5h.

Figure 5A:
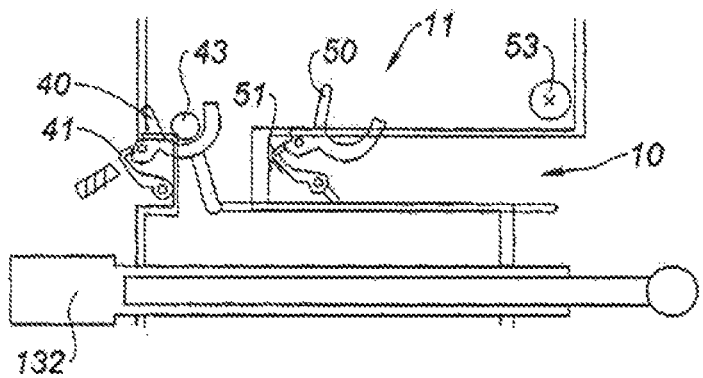
FIGS. 5a to 5h represent the different steps for locking and attaching the movable portions of the nacelle according to a third form.

In FIG. 5a, the cowl 10/nozzle 10a assembly is closed. The locking device 50 between the cascade vanes 11 and the movable cowl 10 is disconnected and moved away from the corresponding bolt 53 carried by the cascade vanes 11.

The cascade vanes 11 are retracted inside the mid-section, and are retained in position by another locking device 40 blocked by a locking blade 41 and engaged with a corresponding bolt 43 carried by the cascade vanes 11, a conventional locking system known to those skilled in the art and allowing the non-opening of the thrust reverser in flight by locking the cascade vanes 11 with the fan casing 4 or any other fixed portion of the nacelle 300.

Figure 5B:
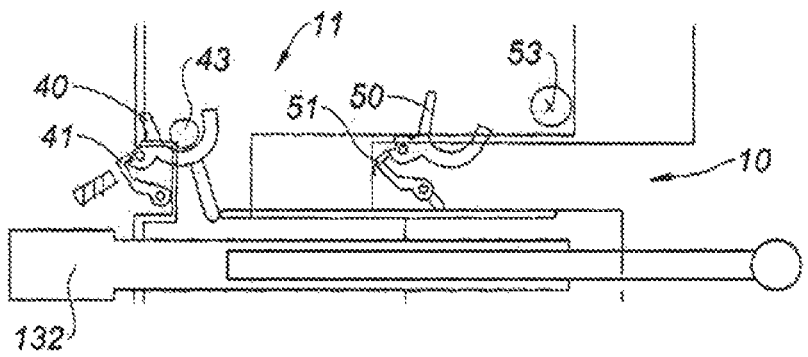

FIG. 5b shows a configuration in which the movable cowl 10/nozzle 10a assembly has slightly moved backward to increase the nozzle section 10a (variable nozzle mode). In such a configuration, the cascade vanes 11 remain locked in the retracted position. The cowl 10/nozzle 10a assembly is displaced between its previous totally closed position and before its thrust reversal backward position.

Figure 5C:
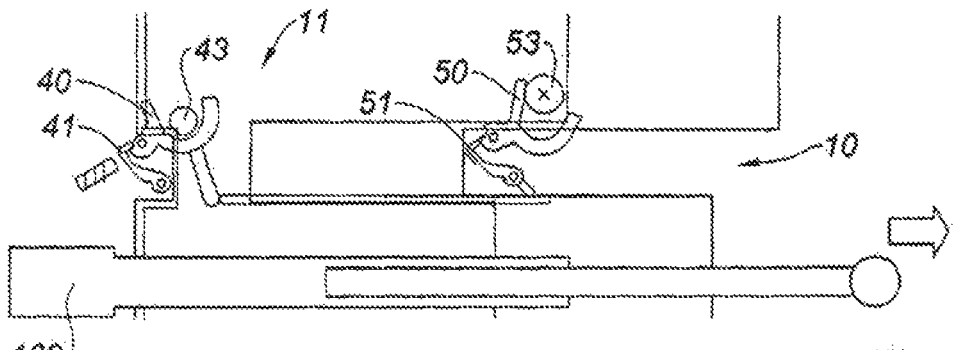
Figure 5D:
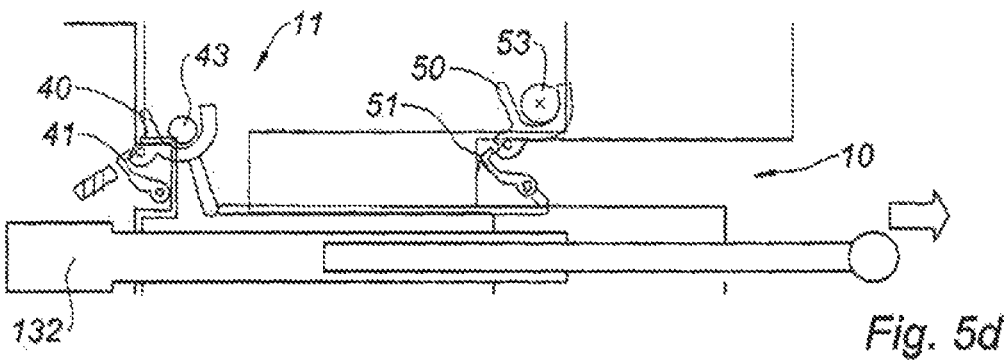

In FIG. 5c, the cowl 10/nozzle 10a assembly has moved backward enough and switches in the thrust reversal mode. To do so, the locking device 50 engages the corresponding bolt 53, which causes attaching of the cascade vanes 11 and of the cowl 10 (FIG. 5d). A spring leaf 51 blocks the locking device 50 in the locked position.

Figure 5E:
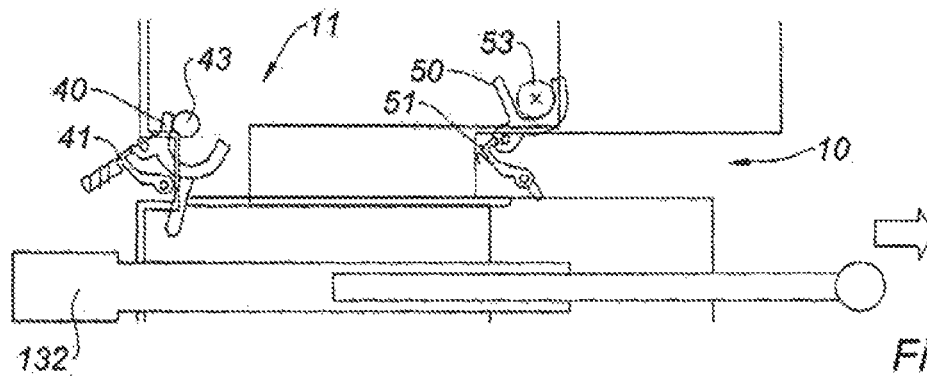
Figure 5F:
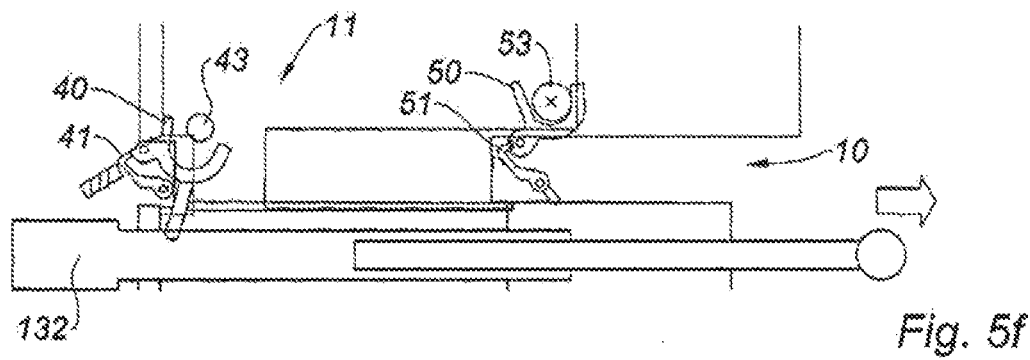

As represented in FIGS. 5e and 5f, once the cascade vanes 11 are attached with the movable cowl 10, they are unlocked upstream of their retracted position.

Figure 5G:
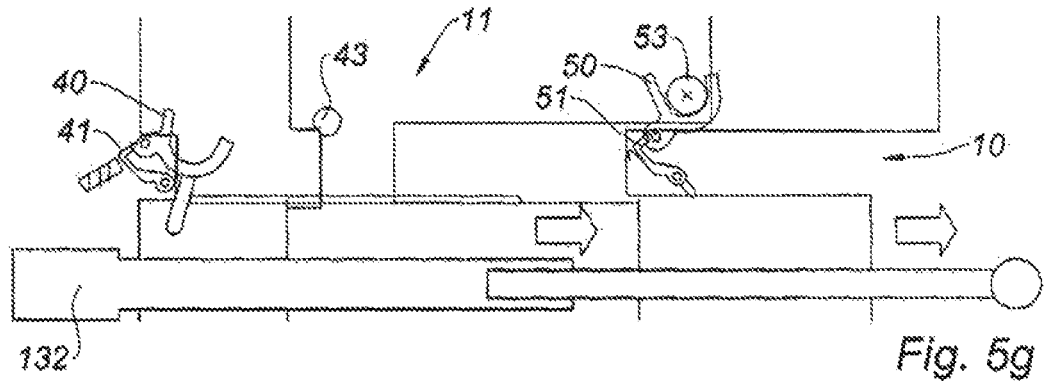

The bolt 43 being thus released, the cascade vanes 11 are driven downstream in translation with the cowl 10 by the actuators 132 (FIG. 5g).

Figure 5H:
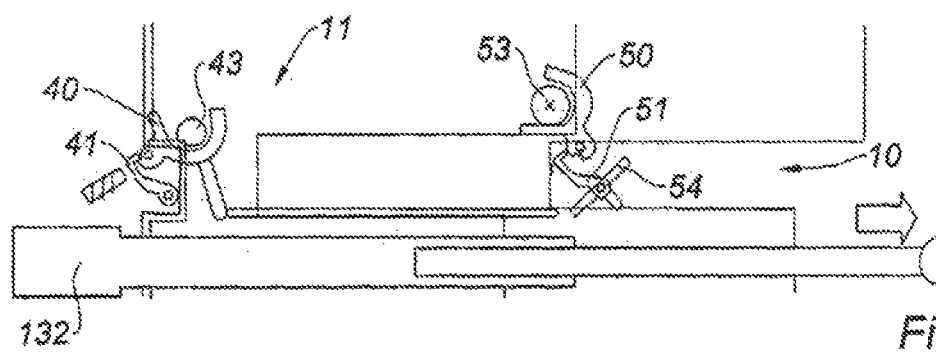

FIG. 5h illustrates the configuration of the locking device for an operation in the maintenance mode.

In this operating mode, the cascade vanes 11 remain in the retracted position and locked upstream by the other locking device 40.

The locking device 50 of the movable cowl tilts around the corresponding bolt 53 in order to allow the additional translation of the cowl 10/nozzle 10a assembly toward the downstream maintenance position.

To do so, the spring leaf 51 for blocking the locking device 50 is kept away by a tool or a member 54. The backward motion is free.

FIGS. 6a to 6c show a nacelle 400 according to a fourth form of the present disclosure.

In this form, the variable nozzle is constituted, as with the nacelle 200, by a terminal portion 10a of the movable cowl which is movably mounted in a telescopic manner inside the movable cowl 10, the latter constituting an intermediate structure.

In this form, there are thus three movable portions, namely the cascade vanes 11, the thrust reversal movable cowl 10 and the variable nozzle portion 10a.

The nozzle variation is hence performed by displacing the variable nozzle portion 10a alone, the thrust reversal movable cowl 10 remaining in the closing position. The displacement of the variable nozzle portion 10a is performed by means of an assembly of actuators 133.

Unlike the nacelle 200, the nacelle 400 is equipped with only one assembly of actuators 133 connected to the nozzle 10a.

The dissociable driving between the cascade vanes 11, the movable cowl 10 and the nozzle is performed via a disconnectable locking device between, on the one hand, the cascade vanes 11 and the movable cowl 10, and on the other hand, between the movable cowl 10 and the nozzle 10a, as with the nacelle 200.

When the locking device between the movable cowl 10 and the nozzle 10a is disconnected, the actuators 133 allow actuating the nozzle portion 10a alone in the nozzle section 10a variation mode (FIG. 6a). The operation of this locking device is identical to that described above for the nacelle 300.

During an operation in the thrust reversal mode, the locking device between the cowl 10 and the nozzle 10a is connected, as well as those between the cowl 10 and the cascade vanes 11 (FIG. 6b).

Finally, during an operation in the maintenance mode, the locking device between the cascade vanes 11 and the cowl 10 is manually disconnected whereas the cowl 10 remains connected to the nozzle 10a (FIG. 6c).

Although the present disclosure has been described with a particular form, it is obvious that it is in no way limited thereto and that it comprises all technical equivalents of the described means as well as their combinations if they are within the scope of the present disclosure.

What is claimed is:

1. A thrust reverser for a turbojet engine nacelle comprising:
    at least one movable cowl translatable along a longitudinal direction of the nacelle between a closing position in which said movable cowl provides an aerodynamic continuity of the nacelle and inhibits cascade vanes for diverting air flow, and a maintenance position, located beyond a thrust reversal position, in which said movable cowl opens a passage within the nacelle and allows accessing the inside of the nacelle, said movable cowl being further extended by at least one portion forming a movable variable nozzle associated with at least one actuator for driving in translation along the longitudinal direction of the nacelle between a reduced ejection section position and an increased section position;
    said cascade vanes movably mounted and translating in the longitudinal direction by said at least one actuator between a retracted position upstream of the movable cowl in which said cascade vanes are housed inside an envelope formed by a fan casing and an outer cowl of the nacelle, and an active position in which said cascade vanes are displaced downstream so as to extend through a passage open by the movable cowl in the nacelle to divert the air flow; and
    a locking device disposed between the cascade vanes and the movable cowl, the locking device engaging a bolt on the cascade vanes by downstream movement of said at least one actuator, wherein a leaf spring blocks the locking device in the thrust reversal position, and continued downstream movement of said at least one actuator toward the maintenance position causes tilting of the locking device around the bolt, wherein the leaf spring is kept away from the locking device by a tool, thus allowing further downstream movement of the cascade vanes.

2. The thrust reverser according to claim 1, wherein said at least one portion forming the movable variable nozzle is integrated to the movable cowl so as to move together.

3. The thrust reverser according to claim 1, wherein said at least one portion forming the movable variable nozzle is movably mounted relative to the movable cowl, the movable cowl being disconnectable by the locking device for attaching with said at least one portion forming the movable variable nozzle.

4. The thrust reverser according to claim 1, wherein the cascade vanes are disconnectable from the movable cowl by the locking device.

5. The thrust reverser according to claim 4, wherein the locking device between the cascade vanes and the movable cowl is adapted to collaborate with another locking device arranged between the cascade vanes and a fixed structure of said thrust reverser of said nacelle.

6. The thrust reverser according to claim 3, wherein the locking device between the movable cowl and the at least one portion forming a variable nozzle is adapted to collaborate with another locking device arranged between the cascade vanes and a fixed structure of said thrust reverser of said nacelle.

7. The thrust reverser according to claim 1, further comprising an O-Duct type thrust reverser.

8. A turbojet engine nacelle, comprising at least one thrust reverser according to claim 1.

* * * * *